United States Patent [19]

Negi

[11] Patent Number: 5,528,635
[45] Date of Patent: Jun. 18, 1996

[54] SYNCHRONIZATION DETECTING CIRCUIT

[75] Inventor: Keiji Negi, Tokyo, Japan

[73] Assignee: Ando Electric Co., Ltd., Tokyo, Japan

[21] Appl. No.: 492,760

[22] Filed: Jun. 21, 1995

[30] Foreign Application Priority Data

Jul. 15, 1994 [JP] Japan ................................ 6-186280

[51] Int. Cl.⁶ ................................ H04L 7/00; H03L 7/08
[52] U.S. Cl. ........................... 375/367; 375/368; 370/107
[58] Field of Search ..................................... 375/208, 209,
375/210, 365, 367, 368, 360; 370/107

[56] References Cited

U.S. PATENT DOCUMENTS

| | | | |
|---|---|---|---|
| 4,747,116 | 5/1988 | Yajima et al. | 375/368 |
| 4,849,995 | 7/1989 | Takeo et al. | 375/367 |
| 5,442,405 | 8/1995 | Taniguchi et al. | 375/368 |

*Primary Examiner*—Young T. Tse
*Assistant Examiner*—Thuy-Licu Nguyen
*Attorney, Agent, or Firm*—Finnegan, Henderson, Farabow, Garrett & Dunner

[57] ABSTRACT

A testing device is provided to test performance of transmission systems such as communication devices and transmission lines by transmitting and receiving specific patterns called pseudo-random patterns (i.e., PN patterns). A receiver unit of the testing device provides a synchronization detecting circuit. The synchronization detecting circuit comprises a pseudo-random-pattern creating circuit, a first coincidence detecting block, a second coincidence detecting block and an OR circuit. The first coincidence detecting block detects coincidence between a receiving-data input, a first detected-pattern input and a pseudo-random pattern created by the pseudo-random-pattern creating circuit so as to produce a first coincidence detecting signal. The second coincidence detecting block detects coincidence between the receiving-data input, a second detected-pattern input and the pseudo-random pattern so as to produce a second coincidence detecting signal. The first and second coincidence detecting signals are applied to the OR circuit, by which a synchronous detection signal is produced. Thus, synchronization between the receiving-data input and pseudo-random pattern is detected by the synchronous detection signal. Incidentally, each of the first and second detected-pattern inputs receives the pseudo-random pattern transmitted thereto through the transmission system; and the second detected-pattern input is delayed behind the first detected-pattern input by 'm' bits (where 'm' is an integer which is determined in advance).

5 Claims, 4 Drawing Sheets

SYNCHRONIZATION DETECTING CIRCUIT

BACKGROUND OF THE INVENTION

The present invention relates to synchronization detecting circuits which detect synchronization between receiving data and reference data in receiver units, provided in transmission systems, so as to test performance of data transmission.

Pseudo-random patterns (simply called 'PN patterns', where 'PN' is an abbreviation for 'Pseudo Noise') are frequently used to test performance of communication devices, transmission devices, transmission lines and the like. There is provided a testing device which transmits or receives PN patterns to perform tests on the above devices. The testing device contains a receiver unit which detects synchronization between receiving data and reference data so that evaluation of the receiving data is performed. The receiver unit contains a pseudo-random pattern creating circuit (simply called a 'PN creating circuit') which creates reference PN patterns. A synchronization detecting circuit is provided to detect synchronization between the reference PN patterns and PN patterns received by the receiver unit.

FIG. 2 is a block diagram showing an example of a synchronization detecting circuit. The synchronization detecting circuit comprises a comparison circuit 11, a pattern comparison circuit 12, a coincidence detecting circuit 13 and a PN creating circuit 4. In addition, there are provided a receiving-data input 6, a detected-pattern input 17 and a synchronization-detection output 8. Herein, the receiving-data input 6 indicates input of receiving data, containing PN patterns, which are received by a receiver unit of a testing device through transmission lines or the like which are objects to be tested; and the detected-pattern input 17 indicates a certain part of the PN patterns included in the receiving data. The PN-pattern creating circuit 4 creates a reference PN pattern. The comparison circuit 11 compares the receiving-data input 6 with the detected-pattern input 17 so as to detect coincidence of data between them. When the coincidence of data Is detected, the comparison circuit 11 produces a detection pulse. The pattern comparison circuit 12 compares the detected-pattern input 17 with the reference PN pattern outputted from the PN-pattern creating circuit 4 so as to detect coincidence of data between them. When the coincidence of data is detected, the pattern comparison circuit 12 produces a detection pulse.

The coincidence detecting circuit 13 performs monitoring as to whether or not the comparison circuit 11 produces the detection pulse at a timing when the detection pulse of the pattern comparison circuit 12 occurs. If so, the coincidence detecting circuit 13 produces a synchronous detection signal at the synchronization-detection output 8. If not, the coincidence detecting circuit 13 produces an asynchronous detection signal.

Now, method in detection of synchronization will be explained. In general, the PN pattern has a property that if a number of PN stages is represented by 'n' (where 'n' is an integer), a pattern of n bits or more occurs only once consecutively in one period, i.e., In $(2^n-1)$ bits. For this reason, when detecting synchronization between receiving data and reference data, created by the PN creating circuit within the receiver unit, monitoring is performed as to whether or not the pattern of n bits occurs periodically at a timing at which both of the receiving data and reference data exist.

In FIG. 2, If a number of PN stages applied to the receiving-data input 6 is represented by 'N' (where 'N' is an integer), the detected-pattern input 17 corresponds to fixed patterns of N bits or more which are consecutively arranged in the PN pattern. As described before, the comparison circuit 11 produces a detection pulse when detecting coincidence between the receiving-data input 6 and the detected-pattern input 17, while the pattern comparison circuit 12 produces a detection pulse when detecting coincidence between the reference PN pattern, outputted from the PN pattern creating circuit 4, and the detected-pattern input 17.

An example of a comparison circuit is shown in FIG. 3. In FIG. 3, there are provided a PN-pattern input 31, a detected-PN-pattern input 32, a detection-signal output 33, D flip-flop circuits (DFF circuits) 34-1 to 34-N, exclusive-NOR circuits 35-1 to 35-N, an AND circuit 36 and a clock input 37. Herein, each of the DFF circuits is represented by a numeral '34', while each of the exclusive-NOR circuits is represented by a numeral '35'.

The PN-pattern input 31 is delayed by the DFF circuit 34. The exclusive-NOR circuit 35 performs comparison between the PN pattern delayed and the detected-PN-pattern input 32 by each bit. If two inputs to the exclusive-NOR circuit 35 are the same, an output of the exclusive-NOR circuit 35 is 'HIGH'. If the two inputs are different from each other, an output of the exclusive-NOR circuit 35 is 'LOW'.

The AND circuit 36 yields a logical product between outputs of the exclusive-NOR circuits 35-1 to 35-N, so the AND circuit 36 receives 'N' inputs. If all of the 'N' inputs are 'HIGH', an output of the AND circuit 36 is 'HIGH'. If not, an output of the AND circuit 36 is 'LOW'. In short, only when all bits of the PN pattern delayed perfectly coincide with all bits of the detected-PN-pattern input 32, the detection-signal output 33 becomes 'HIGH'.

When the receiving data, received by the receiver unit, are applied to the PN-pattern input 31, the comparison circuit of FIG. 3 serves as the comparison circuit 11 in FIG. 2. Similarly, when the output of the PN-pattern creating circuit 4 is applied to the PN-pattern input 31, the comparison circuit of FIG. 3 serves as the pattern comparison circuit 12 in FIG. 2. Herein, the detected-pattern input 17 is applied to the detected-PN-pattern input 32 of the comparison circuit of FIG. 3.

If the receiving data, received by the receiver unit, indicate a correct PN pattern which does not contain an error, and if synchronization exists between the receiving data and output of the PN creating circuit 4, both of the comparison circuits 11 and 12 periodically produce detection pulses at same timings.

There is a possibility that an error (or errors) occurs in the receiving-data input 6. In such an error event, there comes a moment at which the pattern comparison circuit 12 produces a detection pulse while the comparison circuit 11 does not produce a detection pulse. In order to cope with the error event, the coincidence detecting circuit 13 is provided to monitor as to whether or not the comparison circuit 11 produces a detection pulse when the pattern comparison circuit 12 produces a detection pulse. If coincidence of the detection pulses is detected, a synchronous detection signal is produced. If it is not detected, an asynchronous detection signal is produced.

The synchronization detecting circuit of FIG. 2 suffers from a problem that detection of synchronization cannot be performed unless all bits of the detected pattern in the receiving data are received correctly. This circuit suffers from another problem that detection of synchronization cannot be performed when transmitting and receiving testing data which are masked using a period irrelevant to the period of the PN pattern.

An example of the testing data, which are masked using the period irrelevant to the period of the PN pattern, are shown by FIG. 4A in connection with FIG. 4B. Each of numerals 41-1 and 41-2 represents an interval for consecutive 'a' bits of a PN pattern, while each of numerals 42-1 and 42-2 represents a fixed interval for consecutive 'b' bits which are 'HIGH' or 'LOW'. Incidentally, last data '$D_x$' of the interval 41-1 is followed by first data '$D_{x+b}$' of the interval 41-2.

The testing data of FIG. 4A have a period, represented by 'a+b', which is irrelevant to the period of the PN pattern. In such a period of the testing data, 'b' bits are consecutively set at 'HIGH' or 'LOW'. So, when using data, which are masked responsive to a certain period irrelevant to the period of the PN pattern, as the testing data, there is a possibility that a detected pattern should be partially masked. In such a masked event, the synchronization detecting circuit of FIG. 2 cannot perform detection of synchronization well.

SUMMARY OF THE INVENTION

It is an object of the present invention to provide a synchronization detecting circuit which is capable of detecting synchronization between a reference pattern and a detected pattern, regardless of errors which occur in the detected pattern.

It is another object of the present invention to provide a synchronization detecting circuit which is capable of performing detection of synchronization on receiving data whose period is irrelevant to a period of the reference pattern.

The synchronization detecting circuit, according to the present invention, comprises a pseudo-random-pattern creating circuit, a first coincidence detecting block, a second coincidence detecting block and an OR circuit. The first coincidence detecting block detects coincidence between a receiving-data input, a first detected-pattern input and a pseudo-random pattern created by the pseudo-random-pattern creating circuit so as to produce a first coincidence detecting signal. The second coincidence detecting block detects coincidence between the receiving-data input, a second detected-pattern input and the pseudo-random pattern so as to produce a second coincidence detecting signal. The first and second coincidence detecting signals are applied to the OR circuit, by which a synchronous detection signal is produced. Thus, synchronization between the receiving-data input and pseudo-random pattern is detected by the synchronous detection signal.

Incidentally, each of the first and second detected-pattern inputs receives the pseudo-random pattern transmitted thereto through transmission system or the like; and the second detected-pattern input is delayed behind the first detected-pattern input by 'm' bits (where 'm' is an integer which is determined in advance).

BRIEF DESCRIPTION OF THE DRAWINGS

These and other objects of the subject invention will become more fully apparent as the following description is read in light of the attached drawings wherein.

DESCRIPTION OF THE PREFERRED EMBODIMENT

Figure 1:
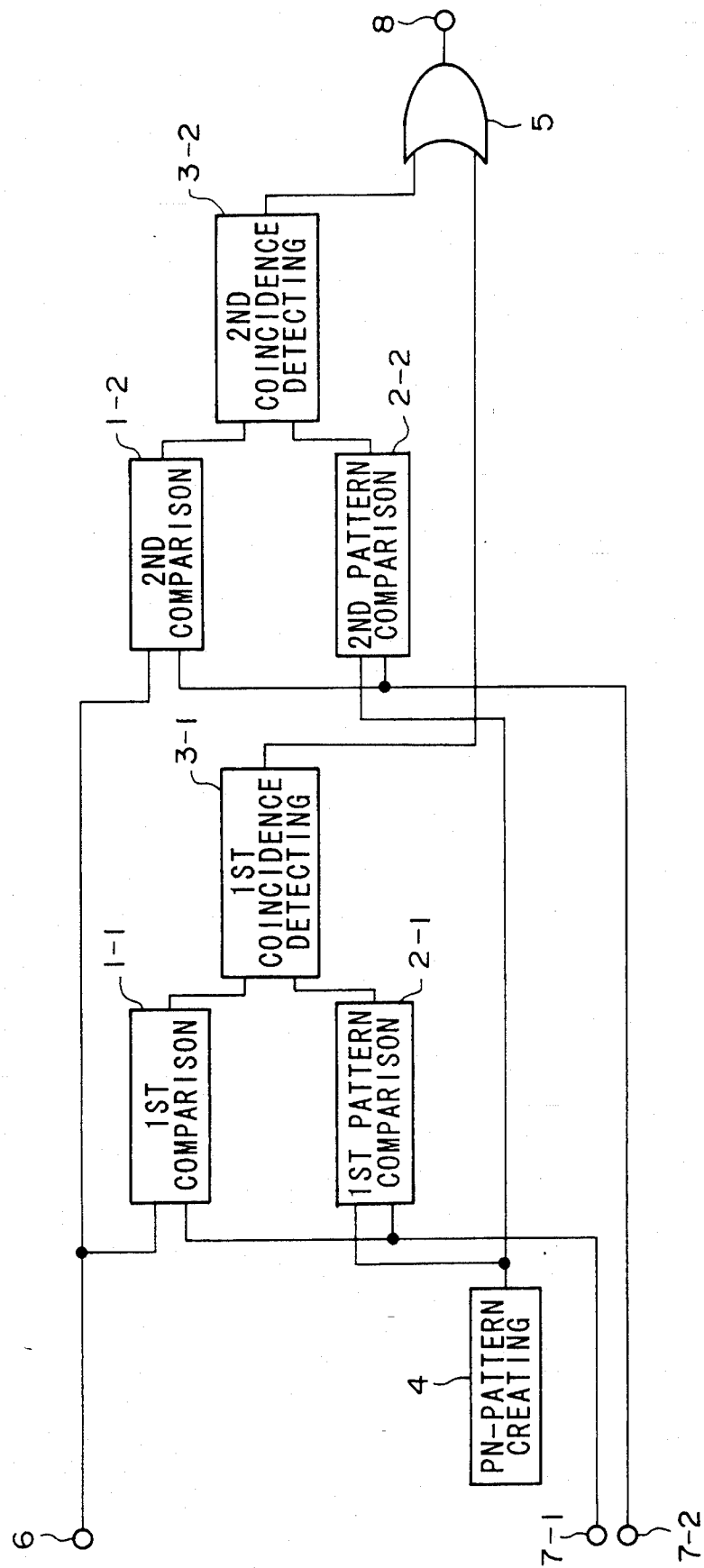
FIG. 1 is a block diagram showing a synchronization detecting circuit according to an embodiment of the present invention.
Figure 2:
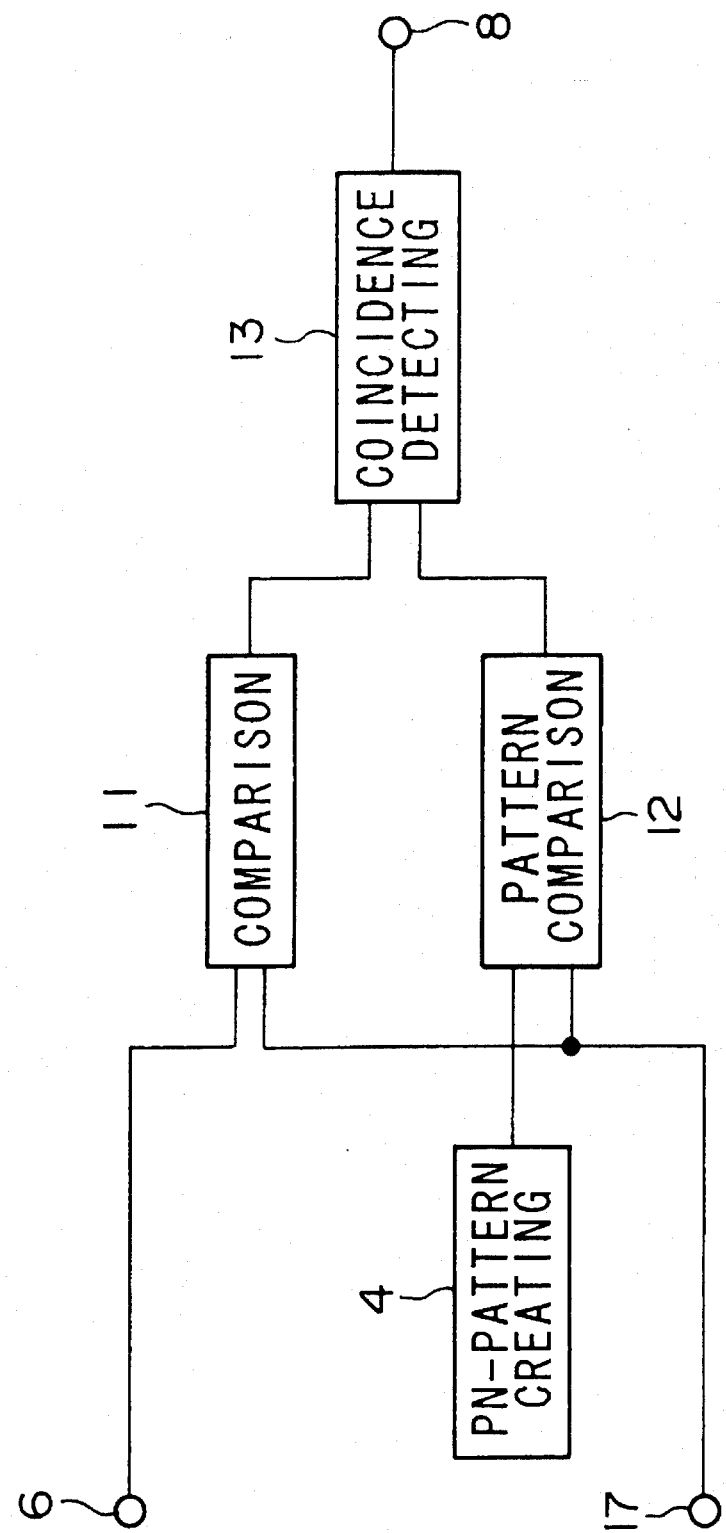
FIG. 2 is a block diagram showing an example of a synchronization detecting circuit which is used as a basis in design for the embodiment.

FIG. 1 is a block diagram showing a synchronization detecting circuit according to an embodiment of the present invention. The synchronization detecting circuit of FIG. 1 comprises a first comparison circuit 1-1, a second comparison circuit 1-2, a first pattern comparison circuit 2-1, a second pattern comparison circuit 2-2, a first coincidence detecting circuit 3-1, a second coincidence detecting circuit 3-2 and an OR circuit 5 as well as the PN-pattern creating circuit 4. Further, there are provided a first detected-pattern input 7-1 and a second detected-pattern input 7-2 as well as the receiving-data input 6 and the synchronization-detection output 8.

Figure 3:
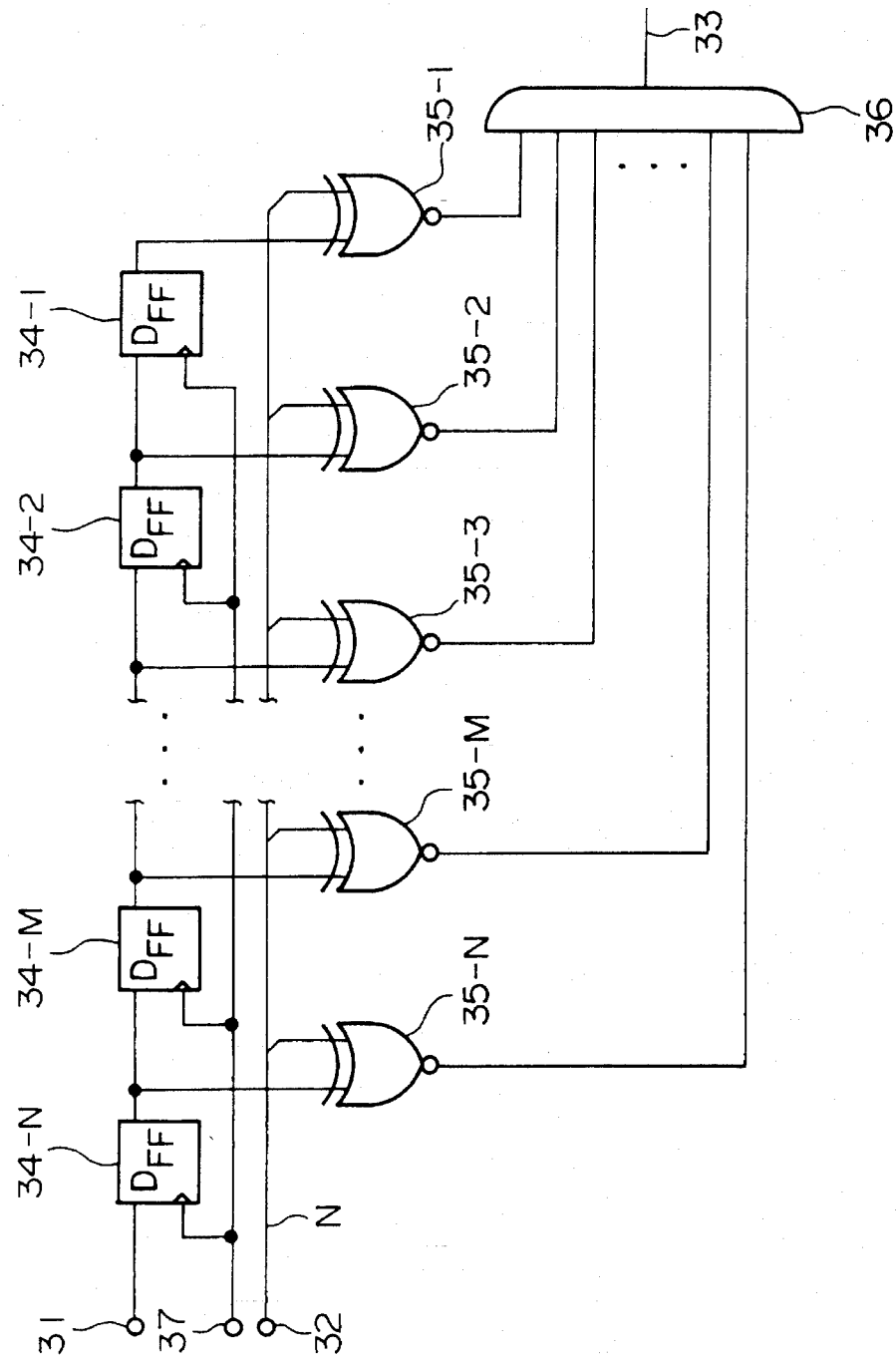
FIG. 3 is a block diagram showing detailed configuration of a comparison circuit employed by the circuit of FIG. 2.
Figure 4A:
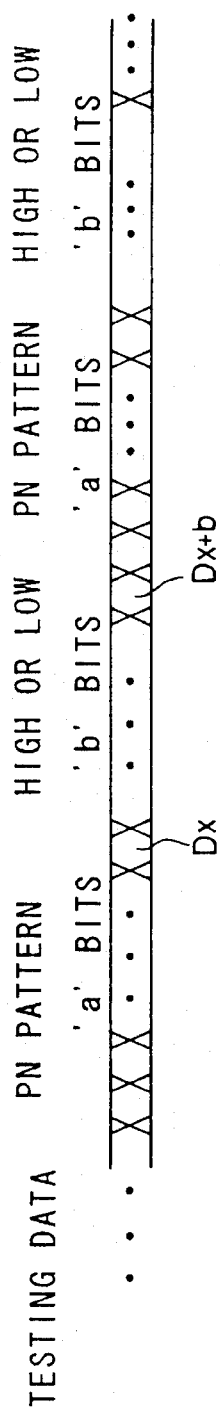
FIGS. 4A and 4B show an example of testing data.
Figure 4B:
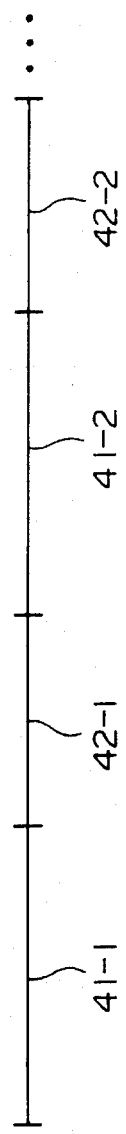

Each of four comparison circuits 1-1, 1-2, 2-1 and 2-2 can be configured using the aforementioned comparison circuit of FIG. 3. In FIG. 1, the first detected-pattern input 7-1 is applied to the first comparison circuit 1-1 and the first pattern comparison circuit 2-1, while the second detected-pattern input 7-2 is applied to the second comparison circuit 1-2 and the second pattern comparison circuit 2-2.

If a number of PN stages is represented by 'N', each of the detected-pattern inputs 7-1 and 7-2 corresponds to a fixed pattern of N bits which consecutively emerge in a PN pattern. If the receiving-data input 6 is assumed as data which are masked in fixed interval of 'b' bits by 'HIGH' or 'LOW', the second detected-pattern input 7-2 comes after the first detected-pattern input 7-1 by a certain number of bits which ranges from 'b' to 'a+b'.

If a PN pattern, which does not have an error, is applied as the receiving-data input 6, the second comparison circuit 1-2 produces a detection pulse at a timing which comes after a timing of a detection pulse, produced by the first comparison circuit 11 by a certain number of clocks ranging from 'b' to 'a+b'. The first coincidence detecting circuit 3-1 monitors as to whether or not the first comparison circuit 1-1 produces a detection pulse while the first pattern comparison circuit 2-1 produces a detection pulse. Similarly, the second coincidence detecting circuit 3-2 monitors as to whether or not the second comparison circuit 1-2 produced a detection pulse while the second pattern comparison circuit 2-2 produces a detection pulse. Each coincidence detecting circuit produces a coincidence detecting signal when both of the detection pulses coincide with each other.

The OR circuit 5 produces a logical OR between the coincidence detecting signals, so the logical OR is used as the synchronization-detection output 8. In short, the OR circuit 5 produces a synchronous detection signal when at least one of the coincidence detecting circuits 3-1 and 3-2 produces a coincidence detecting signal, whereas the OR circuit 5 produces an asynchronous detection signal only when both of the coincidence detecting circuits 3-1 and 3-2 do not produce coincidence detecting signals.

Since two kinds of detected-pattern inputs 7-1 and 7-2 are used for detection of synchronization, even if an error (or errors) occurs in one of them, another of them can be used for the detection of synchronization. Herein, the second detected-pattern input 7-2 is shifted behind the first detected-pattern input 7-1 by a certain number of bits which ranges from 'b' to 'a+b'. So, even if the PN pattern is masked by 'HIGH' or 'LOW' bits periodically in fixed interval of 'b' bits, the synchronization detecting circuit of FIG. 1 can certainly perform detection of synchronization. In short, the present invention can perform the detection of synchronization on any kinds of data, whose period is irrelevant to the period of the PN pattern, regardless of errors which occur in the PN pattern received.

As this invention may be embodied in several forms without departing from the spirit of essential characteristics thereof, the present embodiment is therefore illustrative and not restrictive, since the scope of the invention is defined by the appended claims rather than by the description preceeding them, and all changes that fall within meets and bounds of the claims, or equivalence of such meets and bounds are therefore intended to be embraced by the claims.

What is claimed is:

1. A synchronization detecting circuit comprising:

pseudo-random-pattern creating means for creating a pseudo-random pattern;

first coincidence detecting block for detecting coincidence between a receiving-data input, a first detected-pattern input and the pseudo-random pattern so as to produce a first coincidence detecting signal;

second coincidence detecting block for detecting coincidence between the receiving-data input, a second detected-pattern input and the pseudo-random pattern so as to produce a second coincidence detecting signal; and means for producing a synchronous detection signal based on the first and second coincidence detecting signals, whereby synchronization between the pseudo-random pattern and the receiving-data input is detected by the synchronous detection signal.

2. A synchronization detecting circuit as defined in claim 1 wherein the means produces the synchronous detection signal when either the first coincidence detecting signal or the second coincidence detecting signal is applied thereto.

3. A synchronization detecting circuit as defined in claim 1 wherein each of the first and second detected-pattern inputs receives the pseudo-random pattern transmitted thereto through transmission means and the second detected-pattern input is delayed behind the first detected-pattern input by 'm' bits (where 'm' is an integer which is determined in advance).

4. A synchronization detecting circuit comprising:

pseudo-random-pattern creating means for creating a pseudo-random pattern;

first comparison means for comparing a receiving-data input and a first detected-pattern input so as to produce a detection pulse;

first pattern comparison means for comparing the pseudo-random pattern and the first detected-pattern input so as to produce a detection pulse;

first coincidence detecting means for detecting coincidence between the detection pulse of the first comparison means and the detection pulse of the first pattern comparison means so as to produce a first coincidence detecting signal;

second comparison means for comparing the receiving-data input and a second detected-pattern input so as to produce a detection pulse;

second pattern comparison means for comparing the pseudo-random pattern and the second detected-pattern input so as to produce a detection pulse;

second coincidence detecting means for detecting coincidence between the detection pulse of the second comparison means and the detection pulse of the second pattern comparison means so as to produce a second coincidence detecting signal; and means for producing a logical OR between the first and second coincidence detecting signals so as to produce a synchronous detection signal, whereby synchronization between the receiving-data input and the pseudo-random pattern is detected by the synchronous detection signal.

5. A synchronization detecting circuit as defined in claim 4 wherein each of the first and second detected-pattern inputs receives the pseudo-random pattern transmitted thereto through transmission means and the second detected-pattern input is delayed behind the first detected-pattern input by 'm' bits (where 'm' is an integer which is determined in advance).

* * * * *